United States Patent [19]

Hirst

[11] Patent Number: 4,525,114
[45] Date of Patent: Jun. 25, 1985

[54] FASTENER DEVICE

[75] Inventor: John A. B. Hirst, Wolverhampton, England

[73] Assignee: Rotabolt Limited, Dudley, England

[21] Appl. No.: 309,800

[22] Filed: Oct. 8, 1981

[30] Foreign Application Priority Data

Oct. 8, 1980 [GB] United Kingdom ................ 8032340
Dec. 5, 1980 [GB] United Kingdom ................ 8039044

[51] Int. Cl.³ ............................................. F16B 31/02
[52] U.S. Cl. ...................................... 411/9; 411/395; 403/27; 73/761
[58] Field of Search ................. 116/DIG. 34; 73/761; 411/8, 395, 382, 9; 403/27

[56] References Cited

U.S. PATENT DOCUMENTS

| 839,821 | 1/1907 | Dumont | 411/395 X |
|---|---|---|---|
| 2,413,797 | 1/1947 | Stone | 85/1 |
| 2,602,683 | 7/1952 | Aue | 411/8 X |
| 2,747,454 | 5/1956 | Bowersett | 411/8 |
| 3,237,035 | 2/1966 | Hoffmann | 73/761 X |
| 3,589,234 | 6/1971 | Trigg | 411/9 |
| 3,791,210 | 2/1974 | Taylor | 73/862.53 X |
| 3,823,639 | 7/1974 | Liber | 73/761 |
| 3,881,392 | 5/1975 | Curtis | |
| 3,882,719 | 5/1975 | Fletcher et al. | 73/862.53 X |
| 3,954,004 | 5/1976 | Orner | 73/761 |
| 4,205,572 | 6/1980 | Weiner | 411/8 |

FOREIGN PATENT DOCUMENTS

| 745925 | 5/1944 | Fed. Rep. of Germany | 411/8 |
|---|---|---|---|
| 2714377 | 10/1978 | Fed. Rep. of Germany | 411/8 |
| 2746689 | 2/1979 | Fed. Rep. of Germany | 411/8 |
| 2359313 | 2/1978 | France | 411/8 |
| 2036908 | 7/1980 | United Kingdom | 411/8 |
| 2052079 | 1/1981 | United Kingdom | 411/395 |

Primary Examiner—Richard J. Scanlan, Jr.
Attorney, Agent, or Firm—Spencer & Frank

[57] ABSTRACT

An elongate pin extends in an axial bore in a threaded fastener, at least one end portion of the pin protruding from the bore. An abutment is provided on said one end portion, while when the fastener is in an unstressed condition may rotate about the longitudinal axis thereof. Conversely, when the fastener is subjected to a predetermined tension, rotation of the abutment is prevented by engagement with an end face of the fastener.

10 Claims, 3 Drawing Figures

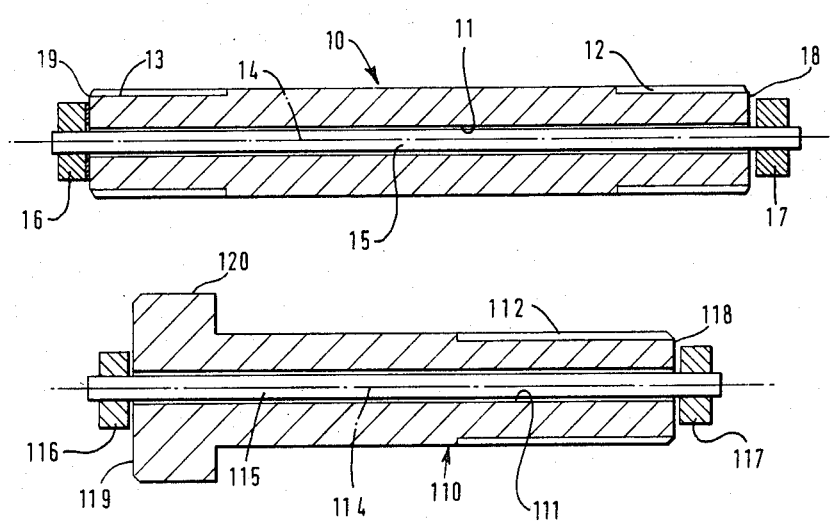
FIG 1
FIG 2
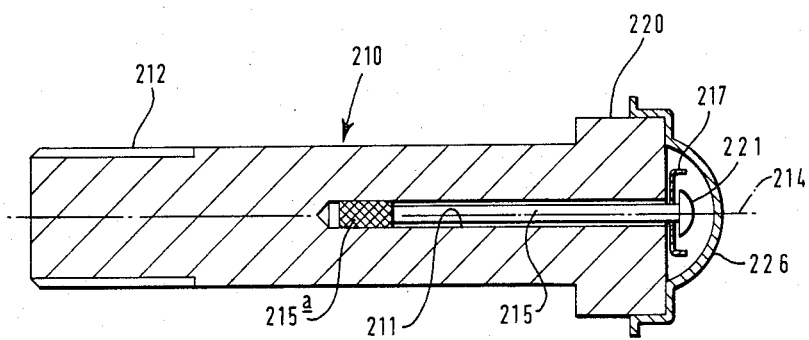
FIG 3

FASTENER DEVICE

BACKGROUND OF THE INVENTION

This invention relates to a device comprising a fastener formed with a male screw thread and which, in use, is subjected to tension. The invention may be applied to bolts and studs.

The invention concerns the provision in a fastener device of means for enabling a user to determine when the device has been tightened to a predetermined degree. An example of a fastener device having such means is disclosed in U.S. Pat. No. 2,413,797. This known fastener device is a bolt having a bore which extends along the axis of the bolt and is open at each end of the bolt. In an end face of the bolt remote from the head, there is provided a transverse groove. A rod extends along the entire length of the bore and is secured to the bolt adjacent to the head thereof. At the opposite end of the rod, there is provided an elongated head which, when the bolt is unstressed, protrudes from the end of the bolt. When the bolt is subjected to a predetermined stress, the bolt is stretched and the head of the rod seats in the transverse groove so that it no longer protrudes from the end of the bolt. This indicates visually to the user that the bolt has been tightened a predetermined amount.

The degree of accuracy with which a predetermined stress can be established in the bolt disclosed in the aforesaid U.S. Patent depends upon the quality of the eyesight of the user, qualities of the fastener device, for example the colour and cleanliness of the head of the rod and of the end of the bolt, an adequate level of illumination of the fastener device and upon whether the fastener device can be viewed from an appropriate position so that the line of sight is substantially perpendicular to the length of the bolt.

SUMMARY OF THE INVENTION

According to a first aspect of the invention, there is provided a device comprising a fastener formed with a male screw thread and with an opening extending through the fastener in a direction parallel to an axis of the thread, the device further comprising an elongate element which extends through the opening, characterised in that the elongate element protrudes from opposite ends of the opening, in that there are on the elongate element respective abutments between which the fastener is trapped and in that, when the fastener is unstressed, at least one of the abutments is free to turn about the axis and, when the fastener is subjected to a predetermined tensile stress, the fastener is stretched to engage both abutments under pressure and thereby impede turning of said one of the abutments, relative to the fastener.

When a device in accordance with the invention is in use, the tension in the fastener can be checked by ascertaining whether the abutment is free to turn. If the abutment is free to turn, the tension is below the predetermined value. Clear vision of the fastener is not necessary, in order for the tension to be checked. It is merely necessary that the one abutment can be reached.

At least one, and preferably both, of the abutments is structurally separate from the elongate element and is engaged therewith in a manner to prevent movement of the abutment relative to the elongate element along the axis.

According to a second aspect of the invention there is provided a device comprising a hollow fastener formed with a male screw thread, a pin which is arranged coaxially with the thread and is disposed partly inside the fastener and partly protruding therefrom, a part of the pin which lies outside the fastener having an abutment which lies adjacent to an end face of a fastener, and a part of the pin remote from the abutment being anchored against movement relative to the fastener along the axis towards said end face, characterised in that, when the fastener is unstressed, the abutment is free to turn about the axis relative to the fastener and, when the fastener is subjected to a predetermined tensile stress, the fastener is stretched to establish a pressure contact between the abutment and said end face and thereby impede turning of the abutment relative to the fastener.

According to this invention there is also provided a device comprising a fastener formed with a screw thread and having a bore extending therein parallel to the longitudinal axis of the thread, and an elongate element in the bore, the improvement wherein one end portion of the element protrudes from the bore and means is provided, which is operative between the fastener and the opposite end portion of the element, to prevent movement of said opposite end portion of the element relative to the fastener in at least one axial direction, and wherein when the fastener is in an unstressed condition a member on said one end portion of the elongate element is free to rotate about the longitudinal axis, and wherein when the fastener is subjected to a predetermined tensile stress, the member is brought into contact with the fastener and rotation thereof on said one end portion of the elongate element is prevented.

BRIEF DESCRIPTION OF THE DRAWING

FIG. 1 is a longitudinal sectional view of a stud which is a first of three embodiments of this invention which have been selected for the purposes of illustrating the invention by way of example;

FIG. 2 is a longitudinal sectional view of a bolt which is the second embodiment of this invention; and FIG. 3 is a longitudinal sectional view of a bolt which is the third embodiment of the invention.

DESCRIPTION OF THE PREFERRED EMBODIMENTS

The stud 10 shown in FIG. 1 is hollow, having an opening 11 extending completely through the stud from one end thereof to the other end. On opposite end portions of the stud are formed respective male screw threads 12 and 13. The threads and the opening 11 have a common axis 14.

There extends through the opening 11 an elongate element in the form of a pin 15, opposite end portions of which protrude from the opening at opposite ends of the stud. On the protruding end portions are secured respective abutments 16 and 17 which lie adjacent to respective end faces 18 and 19 of the stud and are fixed with respect to the pin. These abutments are fixed with respect to the pin 15 and may be structurally separate elements which are crimped or swaged onto the pin. At least one of the abutments is applied to the pin 15 after the pin has been inserted through the opening 11, thereby trapping the stud 10 between the abutments on the pin.

The pin 15 is a free sliding fit inside the stud 10. When the device is unstressed, the separation between the abutments 16 and 17 is slightly greater than the length of the stud so that the abutments and pin can turn freely together about the axis 14 relative to the stud. When the stud is subjected to tensile stress, it is stretched. When a predetermined part of the length of the stud is subjected to a predetermined tensile stress, the length of the stud is increased to the distance separating the abutments 16 and 17. The end faces of the stud then engage the abutments under sufficient pressure to inhibit rotation of the abutments and pin 15. A user can ascertain when the predetermined stress has been achieved by testing one of the abutments for freedom to turn about the axis. When the abutment cannot be turned by hand, the predetermined stress has been achieved.

Certain parts of the bolt shown in FIG. 2 correspond to parts of the stud hereinbefore described with reference to FIG. 1. Such corresponding parts are indicated by like reference numerals with the prefix 1 and the preceding description is deemed to apply, except for the differences hereinafter mentioned.

The bolt 110 has a screw thread 112 on one end portion and a head 120 at its opposite end. In use, the thread 112 is engaged with a female screw thread formed in a further member (not shown) and a part of the bolt lying between that further member and the head 120 is subjected to tensile stress. When the tensile stress reaches a predetermined value, pressure contact is established between abutment 116 and the head 120 and between abutment 117 and an end face 118 of the bolt remote from the head. This pressure contact impedes turning of the abutments and pin 115 about the axis 114.

In the stud shown in FIG. 1 and the bolt shown in FIG. 2, identical annular abutments are provided at opposite ends of the pin. In an alternative arrangement, there may be provided at one end of the pin an abutment of different form, for example a head on the pin or some other form of abutment integral with the pin or a cotter which extends transversely of the pin through a hole therein. Furthermore, the arrangement may be such that the pin and one abutment are constrained against rotation relative to the fastener, the one abutment anchoring the associated end portion of the pin against axial movement relative to the fastener in a direction towards the other abutment and the other abutment being rotatable relative to the pin whilst the fastener is unstressed. In a case where the abutment is required to be rotatable relative to the pin, when the fastener is unstressed, the abutment may be trapped between a head on the pin and an end face of the fastener.

In the embodiment illustrated in FIG. 3, a bolt 210 has a screw thread 212 on one end portion and a head 220 on its opposite end. In use, the thread 212 is engaged by a female screw thread formed in a further member (not shown) and a part of the bolt lying between that further member and the head 220 is subjected to tensile stress.

The bolt is provided with a bore 211, which is coaxial with the longitudinal axis 214 of the thread 212 of the bolt. Whereas in the embodiments illustrated in FIGS. 1 and 2, the bores 11 and 111 extend entirely through the fastener, in the embodiment illustrated in FIG. 3, the bore 211 extends only part way into the fastener.

The device also comprises an elongate pin 215 in the bore 211, one end portion of the pin which is provided with a head 221, protruding from the bore, the opposite end of the pin being secured within the inner end of the bore 211, as is shown at 215a, and which may be effected by any convenient means, such as screwing, adhesive, or pressing, thus preventing movement of that end portion of the pin relative to the bolt 211.

In the embodiment illustrated in FIG. 3, an abutment in the form of a washer 217 is mounted on said end portion of the pin 215, held captive against axial movement between the head 220 of the bolt and the head 221 of the pin. As shown in the drawing, the head 221 of the pin overlaps with an abutment surface presented by the head 220 of the bolt facing along the axis 214 towards the head of the pin.

When the fastener is in an unstressed condition, the head 221 of the pin is spaced from the head 220 of the bolt, and the washer 217 may rotate on the pin 215. However, when the fastener is subjected to predetermined tensile stress, relative axial movement takes place between the bolt 210 in the region of the head 220 thereof, and said end portion of the pin protruding from the bore 211, and the head 221 of the pin moves towards the head 220 of the bolt, clamping the washer 217 between an abutment surface of the head of the pin and the abutment surface which is an end face of the bolt, to prevent rotation of the washer. Since the washer is trapped between overlapping parts of the abutment faces, it is subjected to compression, but not to shearing forces. Accordingly, there is no tendency for the washer to be flexed when the bolt is subjected to a tensile load.

If desired, a covering 226 may be clipped over the head 220 of the bolt, to maintain the head of the pin and the washer free from dirt.

In each of the examples described herein, the pin has at least approximately the same co-efficient of thermal expansion as does the fastener. Preferably, the pin and the fastener are formed of the same metal so that they have the same co-efficient of thermal expansion. During tightening of the fastener, the abutment or one of the abutments is preferably accessible so that the user can check the freedom of the abutment to turn either continuously or intermittently. The abutment is also preferably accessible during the subsequent service life of the fastener so that the freedom of the abutment to turn can be checked occassionally. If the tension in the fastener falls sufficiently for the abutment to become free to turn, remedial measures can be taken before leakage or damage occurs.

I claim:

1. In a device comprising a fastener formed with a screw thread and having a bore extending therein parallel to the longitudinal axis of the thread, and an elongate element in the bore, the improvement wherein one end portion of the element protrudes from the bore and there is provided means which is operative between the fastener and the opposite end portion of the element for preventing movement of said opposite end portion of the element relative to the fastener in at least one axial direction, and wherein when the fastener is in an unstressed condition a member on said one end portion of the elongate element is free to rotate about the longitudinal axis, and means operative when the fastener is subjected to a predetermined tensile stress for bringing said member into contact with the fastener thereby to prevent rotation of said member about the longitudinal axis.

2. A device comprising a hollow fastener and a pin, wherein the hollow fastener is formed with a male screw thread defining an axis and with an abutment face which faces along the axis, wherein the pin extends along the interior of the fastener, the pin is anchored to the fastener at a position remote from the abutment face against movement of the pin relative to the fastener at said position in a direction towards the abutment face, wherein there is rotatably mounted on the pin an abutment which is adjacent to the abutment face of the fastener and is free to turn relative to the fastener and to the pin when the fastener is unstressed and where there is provided on the pin means for limiting movement of the abutment along the pin in a direction away from the abutment face of the fastener, thereby to hold said abutment captive against axial movement between said abutment face of the fastener and said movement limiting means on said pin, said abutment being prevented from rotation, when the fastener is stressed, by the interaction of said movement limiting means and said abutment face.

3. A device according to claim 2 wherein said pin is arranged co-axially with the thread and is disposed partly inside the fastener and partly protruding therefrom, and wherein said abutment is mounted on a part of the pin which lies outside the fastener.

4. A device according to claim 3 wherein the abutment is trapped between the fastener and a head on the pin.

5. A device according to claim 4 wherein one end portion of the pin is fixed to the fastener.

6. A device according to claim 2 wherein the abutment is accessible directly to the hand of user during tightening of the fastener.

7. A device according to claim 2 wherein said means on the pin for limiting movement of the abutment along the axis presents an abutment face of the pin and wherein the abutment face of the pin overlaps the abutment face of the fastener.

8. A device according to claim 7 wherein there is between the abutment and at least one of said abutment faces a clearance which is eliminated when the fastener is subjected to a predetermined tension.

9. A device according to claim 8 wherein the abutment face of the fastener is an endmost face of the fastener, an end portion of the pin protrudes from the interior of the fastener, said abutment is carried on the end portion of the pin and the abutment lies outside the fastener.

10. In combination, a hollow fastener, a pin and a washer wherein the fastener is formed with a male screw thread defining an axis of the fastener, the fastener has an abutment face which faces along the axis, the pin extends along the interior of the fastener, the pin is anchored to the fastener at a position remote from the abutment face of the fastener against movement of the pin relative to the fastener at said position in a direction towards the abutment face, the pin has an abutment face which is spaced further from said position than is the abutment face of the fastener, the abutment face of the pin faces towards the abutment face of the fastener, the washer is mounted on the end portion of the pin and is trapped between the respective abutment faces of the fastener and pin, the fastener has been set to a predetermined tension and both of said abutment faces engage the washer under pressure, whereby rotation of the washer is impeded while permitting rotation of the washer when there is less than said predetermined tension.

* * * * *